United States Statutory Invention Registration [19]

[11] Reg. Number: H501

Rubin et al.

[43] Published: Aug. 2, 1988

[54] APPARATUS FOR ACOUSTICAL QUIETING OF A CAVITY

[75] Inventors: Donald V. Rubin, Huntsville; Billy J. Walker, Madison, both of Ala.

[73] Assignee: The United States of America as represented by the Secretary of the Army, Washington, D.C.

[21] Appl. No.: 24,092

[22] Filed: Feb. 27, 1987

[51] Int. Cl.[4] ..... B64C 1/14

[52] U.S. Cl. ..... 244/1 R; 244/130; 372/104

[58] Field of Search ..... 244/1 R, 129.1, 130; 350/319, 358; 372/104

[56] References Cited

U.S. PATENT DOCUMENTS 2,721,715 10/1955 Hoadley ..... 244/130

4,703,904 11/1987 Haslund ..... 244/1 R

*Primary Examiner*—Deborah L. Kyle

*Assistant Examiner*—Michael J. Carone

*Attorney, Agent, or Firm*—John C. Garvin, Jr.; Freddie M. Bush; Robert L. Broad, Jr.

[57] ABSTRACT

A system for lowering the level of turbulence in an opening through a wall over which air is flowing at a subsonic velocity wherein an arcuate flange is secured to the downstream edge of the opening and extends into the opening a distance of 0.11 to 0.22 times the length of opening in the direction air flow, the flange being tangent to the wall at the part of attachment of the branch.

5 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

APPARATUS FOR ACOUSTICAL QUIETING OF A CAVITY

DEDICATORY CLAUSE

The invention described herein may be manufactured, used, and licensed by or for the Government for governmental purposes without the payment to us of any royalties thereon.

BACKGROUND OF THE INVENTION

Field of the invention

This invention relates to apparatus for lowering the level of acoustic resonance or turbulence present in an opening in a wall over which air is flowing and apparatus for the transmission and sensing of optical signals unimpeded through the surface of a body moving through the atmosphere at subsonic speed.

Prior art

It is sometimes desirable to determine, from a moving aircraft, the precise direction of a an object or a source of light. Inasmuch as it is not practical to mount imaging equipment on the outside of the hull of an aircraft, this equipment is mounted inside the aircraft adjacent to a window or opening through which light from the object or source passes.

To obtain the most precise detection of the direction of the light source and the sharpest focus of the image of the light source, the window or opening must be free of any glass or other cover. The reason for this is that it is not at present possible to manufacture a transparent closure for the window which will, under operating conditions, not shift the apparent direction of the light source and in addition, defocus the image of the light source. Thus, an open hole in the wall of the aircraft must be used.

The use of the open hole in the wall of the aircraft creates another problem. Air flowing over the hole or cavity at subsonic velocities creates a very high turbulence in the cavity or hole in the wall of the aircraft. This causes the image formed by light passing through the hole to jump from place to place on the element of a sensing unit on which the light falls. When this happens, an accurate sensing of the true direction of the light source cannot be carried out. Further, the acoustic resonance or high turbulence in the hole in the aircraft wall will scatter the light rays from the source so that a sharp image of the source cannot be obtained. This, too, will result in an inaccurate determination of the true direction of the light source.

Further, the turbulence buffets equipment, such as sensors, etc., mounted in the aircraft near the hole. Vibration of this equipment, caused by turbulence, will make it impossible to accurately sense the true direction of the object being observed.

It is known to use a fence to lower turbulence in a hole in a wall along which a stream of air is flowing. The fence, which is usually raked, is secured to the wall adjacent to the upstream edge of the hole. The disadvantage of this approach is that the fence projects outwardly from the aircraft wall into the stream of air flowing along the wall. This, of course, is undesirable.

SUMMARY OF THE INVENTION

A system for lowering the level of acoustic resonance or turbulence in an opening through a wall over which air is flowing at a subsonic velocity, wherein an arcuate flange extends from the downstream edge of the opening into the opening a distance of 0.11 L to 0.22 L, where L is the length of the opening in the direction of air flow, the arcuate flange being tangent to the surface of the wall.

DESCRIPTION OF THE PREFERRED EMBODIMENT

Figure 1:
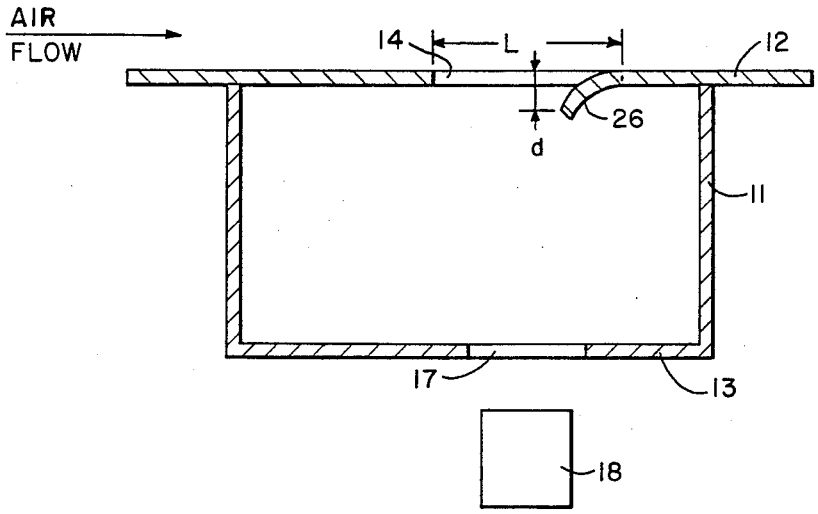
FIG. 1 is a cross sectional view of an enclosure adapted to simulate the interior of an aircraft, the enclosure having a top which is provided with an opening over which a stream of air at subsonic velocity can be directed.
Figure 2:
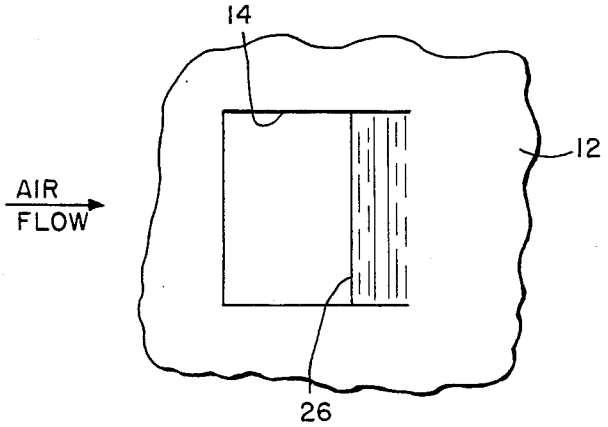
FIG. 2 is an enlarged fragmentary view of the top of the enclosure of FIG. 1 showing the manner in which the flange extends from the downstream edge of the opening into the cavity.

Referring now in detail to the drawings, there is shown in FIG. 1 an enclosure 11 having a generally flat top 12 and a bottom 13, the purpose of the enclosure 11 being to simulate the wall or hull and a portion of the interior of an aircraft having an opening therein. The top 12 of enclosure 11 is provided with an opening or hole 14 through which light rays from a distant object or light source (not shown) can pass the edges of the opening lying generally in the plane of the top 12. The bottom 13 of the enclosure 11 is provided with an optical window 17 through which light rays can pass onto a sensing unit 18 of a known type.

When an air stream at subsonic velocity is passed across the upper surface of the top 12 the air stream will cause turbulence or acoustic resonance in the opening 14 and within the cavity formed by the enclosure 11. This acoustic resonance or turbulence is substantially lessened by the use of an arcuate flange 26 secured to the downstream or trailing edge of the opening 14 and extending into the opening a distance, d, of at least 0.11 L, where L is the length of the opening in the direction of air flow. The term "extending into" refers not to the distance of the distal edge of the flange from the downstream edge of the opening 14 in a direction parallel to the top 12 but refers to the distance the distal edge of the flange 26 extends from the top surface of the top 12 downward into the interior of the enclosure 11. The distance d, which is shown in FIG. 1, should be within the range of 0.11 to 0.22 times the length of the opening 14 in the direction of air flow. The preferred range for the distance, d, is within the range of 0.11 to 0.15 times the length L, of the opening 14. It has been found that when d is within the range of 0.11 L to 0.22 L turbulence in the opening 14 and that portion of the aircraft adjacent to the opening is held to an acceptable level.

The flange 21 has a cross section which defines a portion of a circle, the flange being tangent to the surface of the top 12 at the point where the flange is secured to the edge of the opening 14.

It has been found that, when the distance, d, is reduced below 0.11 L turbulence in the opening 14, and in the interior portion of the aircraft adjacent to the opening 14, begins to significantly reduce image quality and stability. This can be tested by positioning transducers of a known type in the opening 14 and in the interior of the enclosure 11 and measuring pressure fluctuations at various points.

The distance d can be reduced to a value below 0.11 L by using a fence which projects into the downstream at a location upstream of the opening. However, this has the disadvantage that the fence disrupts the flow of air along the aircraft surface.

We claim:

1. Apparatus for the transmission and sensing of optical signals unimpeded through the surface of an aircraft body moving through the atmosphere at subsonic speeds, comprising:

(a) an enlongated opening in said aircraft surface having a leading edge and a trailing edge separated by a length L, said leading edge terminating in the plane of said surface;

(b) a cavity disposed within said aircraft body in unimpeded communication with said elongated opening;

(c) said trailing edge terminating in an arcuate flange which protrudes into said cavity a distance not less then 0.11 L; and (d) sensing and transmitting means in unimpeded communication with said cavity and said elongated opening for sensing and transmitting optical signals without distortion or hindrance from turbulence within the cavity.

2. An apparatus as set forth in claim 1, wherein said arcuate flange protrudes into said cavity a distance not greater than 0.22 L.

3. Apparatus as set forth in claim 1, wherein said flange protrudes into said cavity a distance not greater than 0.15 L.

4. Apparatus as set forth in claim 1, wherein said sensing and transmitting means is disposed outside of said cavity.

5. Apparatus as set forth in claim 1, wherein said cavity is elongated and exceeds the length L.

* * * * *